(12) United States Patent
Pritchard et al.

(10) Patent No.: US 6,488,141 B2
(45) Date of Patent: Dec. 3, 2002

(54) ARTICLE ALIGNMENT AND SINGULATING CONVEYORS AND CONVEYOR SYSTEM

(76) Inventors: Jonathan A. N. Pritchard, 3650 45th Street, Cranbrook, B.C. (CA), V1C 7A1; Murray B. Laidlaw, 1301 4th Ave. S., Cranbrook, B.C. (CA), V1C 2S1; Gordon R. Dunwell, 1829 Mount Connell Crescent, B.C. (CA), V1C 6B8

( * ) Notice: Subject to any disclaimer, the term of this patent is extended or adjusted under 35 U.S.C. 154(b) by 39 days.

(21) Appl. No.: 09/797,432

(22) Filed: Mar. 2, 2001

(65) Prior Publication Data

US 2001/0022261 A1 Sep. 20, 2001

(51) Int. Cl.[7] .............................................. B65G 47/68
(52) U.S. Cl. ....................................... 198/446; 198/771
(58) Field of Search .............................. 198/752.1, 758, 198/771, 446, 389, 390; 193/25 FT

(56) References Cited

U.S. PATENT DOCUMENTS

| | | | | |
|---|---|---|---|---|
| 2,190,620 A | * | 2/1940 | Milmoe et al. | 198/446 |
| 3,258,105 A | * | 6/1966 | Willsey et al. | 198/446 X |
| 3,469,672 A | * | 9/1969 | Stutske et al. | 198/446 X |
| 3,517,797 A | * | 6/1970 | Daleffe et al. | 198/389 |
| 3,633,728 A | * | 1/1972 | Chamberlin | 198/446 X |
| 4,362,236 A | * | 12/1982 | Hedel | 198/446 |
| 4,385,700 A | * | 5/1983 | Hodges et al. | 198/446 X |
| 5,123,516 A | * | 6/1992 | Moore | 198/446 X |

* cited by examiner

Primary Examiner—James R. Bidwell
(74) Attorney, Agent, or Firm—Stanley Johnson

(57) ABSTRACT

A conveyor system of units that move blocks of wood and while moving align them in single file along one or more paths of travel. First in the system is a conventional vibrating conveyor unit followed by a vibrating type conveyor unit having an undulating upper surface defining parallel flow paths. Next is a combination vibrating and belt conveyor unit having an undulating upper surface followed by deeper spaced apart parallel channels. The upper flight of an endless belt travels along the bottom of each of respective ones of the deeper channels. The last unit is a multi-lane article accumulator, cueing and gated dispensing unit.

32 Claims, 10 Drawing Sheets

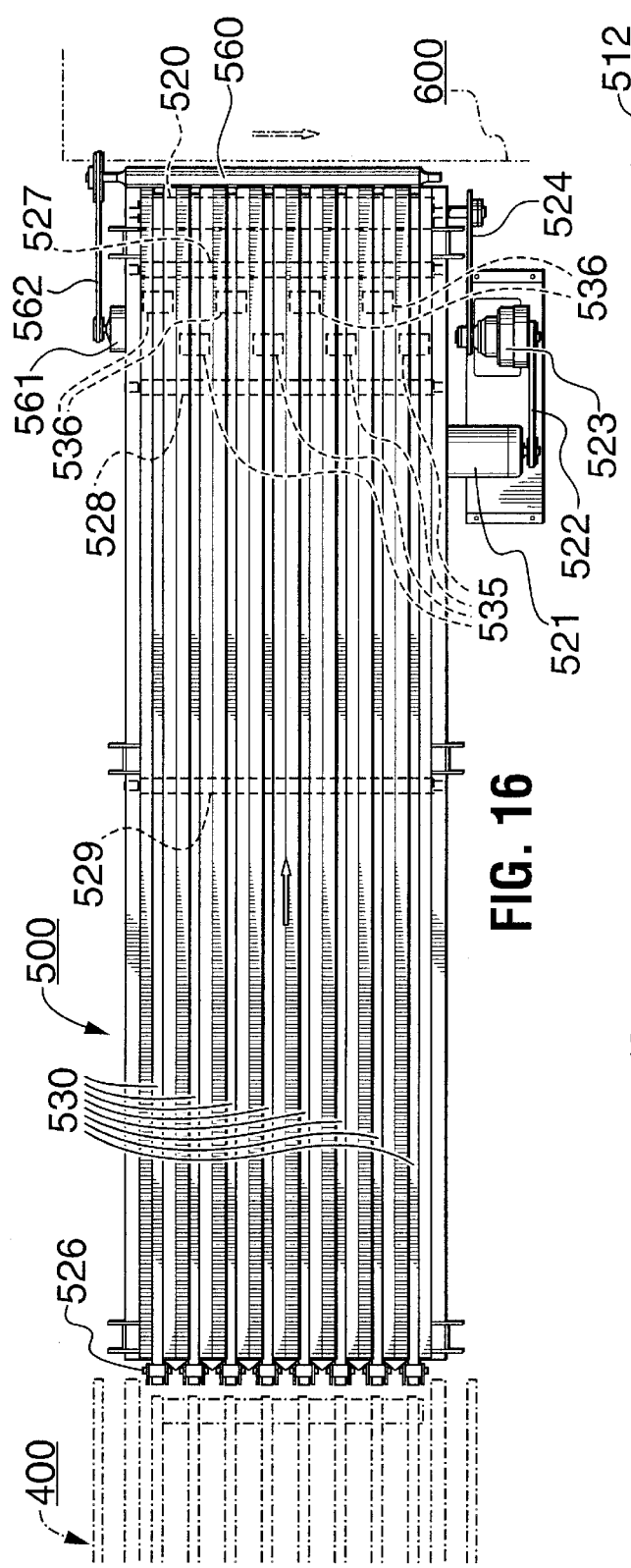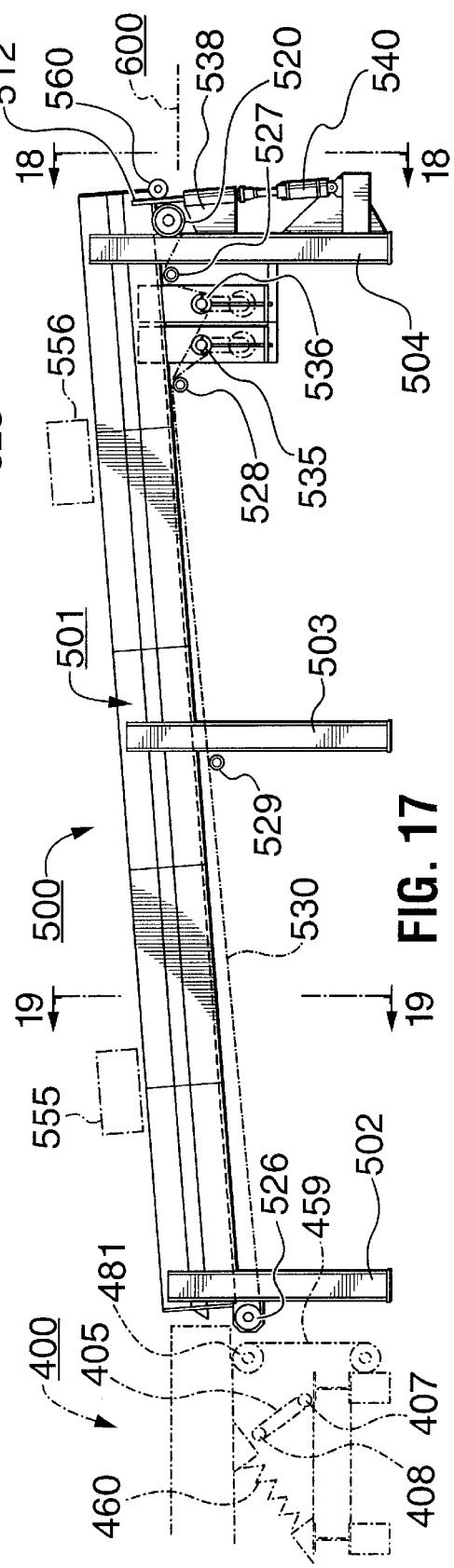

US 6,488,141 B2

ARTICLE ALIGNMENT AND SINGULATING CONVEYORS AND CONVEYOR SYSTEM

FIELD OF INVENTION

This invention relates generally to horizontal conveyors and more particularly to conveyor units and a system of conveyor units for separating, aligning and moving a plurality of articles along one or more paths. One of the conveyor units particularly includes the combination of a vibrating conveyor, having a longitudinally extending trough, and a moving belt flight located in a depressed area, in the bottom of the trough, that extends in a direction longitudinally of the trough.

The conveyor system of the present invention has particularly been designed to receive a random bunch of pieces of wood (finger joint blanks) at the in-feed end of the system, separate that random bunch into the individual pieces of that bunch as they move forwardly and dispense the wood pieces, at suitable spacings, onto the moving belt of an in-feed conveyor of a finger jointer or other wood processing system.

The term 'singulate' will be used herein to describe separating the random bunch into the individual pieces that makes up that random bunch.

It will be apparent to those skilled in the art that the conveyor units and/or conveyor system will have use in other fields and applications.

BACKGROUND OF INVENTION

Short pieces of wood, referred to as blocks of wood, finger joint blanks, planer ends, trim blocks or trim ends, are commonly converted into useful pieces of lumber by a finger jointer. The short wood pieces, or lower value pieces, maybe of any size but the system herein has been designed for wood pieces having a common physical characteristic, namely the thickness dimension, and will be so described herein. The blocks of wood, for example in the present processing system maybe 2"×3", 2"×4" or 2"×6" and in lengths in the range of 10" to 36". These blocks, prior to the present invention, were manually singulated resulting in a variable rate of feed and a sustained upper limit of about 120 pieces per minute. Finger jointers however can process blocks fed at a much faster rate, for example 200 pieces per minute or more.

SUMMARY OF INVENTION

A principal object of the present invention is to provide a conveyor that singulates a random bunch of articles.

A further object of the present invention is to provide a system of conveyor units that includes a conveyor unit of the foregoing to feed articles, for example wood blocks, at a uniform rate to a downstream processing apparatus or system.

A further object of the present invention is to provide a conveyor unit that is a combination vibrating and moving belt conveyor.

A still further object of the present invention is to provide a conveyor system for a waste wood recovery system.

A still further object of the invention is to provide improved article alignment channels in a conveyor or conveying system.

In keeping with the foregoing there is provided in accordance with one aspect of the present invention a conveyor unit to separate and guide articles as they are moved forwardly by said conveyor comprising a support frame, a longitudinally extending trough resiliently mounted on said frame, vibration inducing means connected to said trough and operable to vibrate said trough and thereby cause articles thereon to move forwardly, a depression, in the bottom of said trough, that extends in a direction longitudinally there along and an endless moving belt conveyor having an upper flight portion thereof located in said depression.

In accordance with a further aspect of the present invention there is provided a conveyor system comprising a conveyor unit that includes a longitudinally extending trough having at least one depression in the bottom thereof with each depression providing an upwardly facing channel extending in a direction lengthwise of said trough, vibration inducing means connected to said trough and operative to vibrate the trough and thereby move articles in the trough in a forward direction, an endless moving belt conveyor having an upper flight of the belt located in said channel to move articles resting thereon in said forward direction, said channel providing means aligning the articles in single file one after the other as they move, an in-feed means upstream of said conveyor unit for feeding articles to said conveyor unit, and guide means downstream of said conveyor unit maintaining alignment of said articles as they move forwardly.

In accordance with a further aspect of the present invention there is provided a conveyor with an improved article alignment section comprising parallel channels defining article flow paths and having walls sloping upwardly away from each of the respective channels associated therewith.

LIST OF DRAWINGS

The invention is illustrated, by way of example, in the accompanying drawings wherein:

FIG. 16 is a top plan view of a multi-lane single file gated accumulator conveyor provided in accordance with another aspect of the present invention;

FIG. 17 is a side elevational view of the conveyor shown in FIG. 16;

DESCRIPTION OF PREFERRED EMBODIMENT

Figure 1:
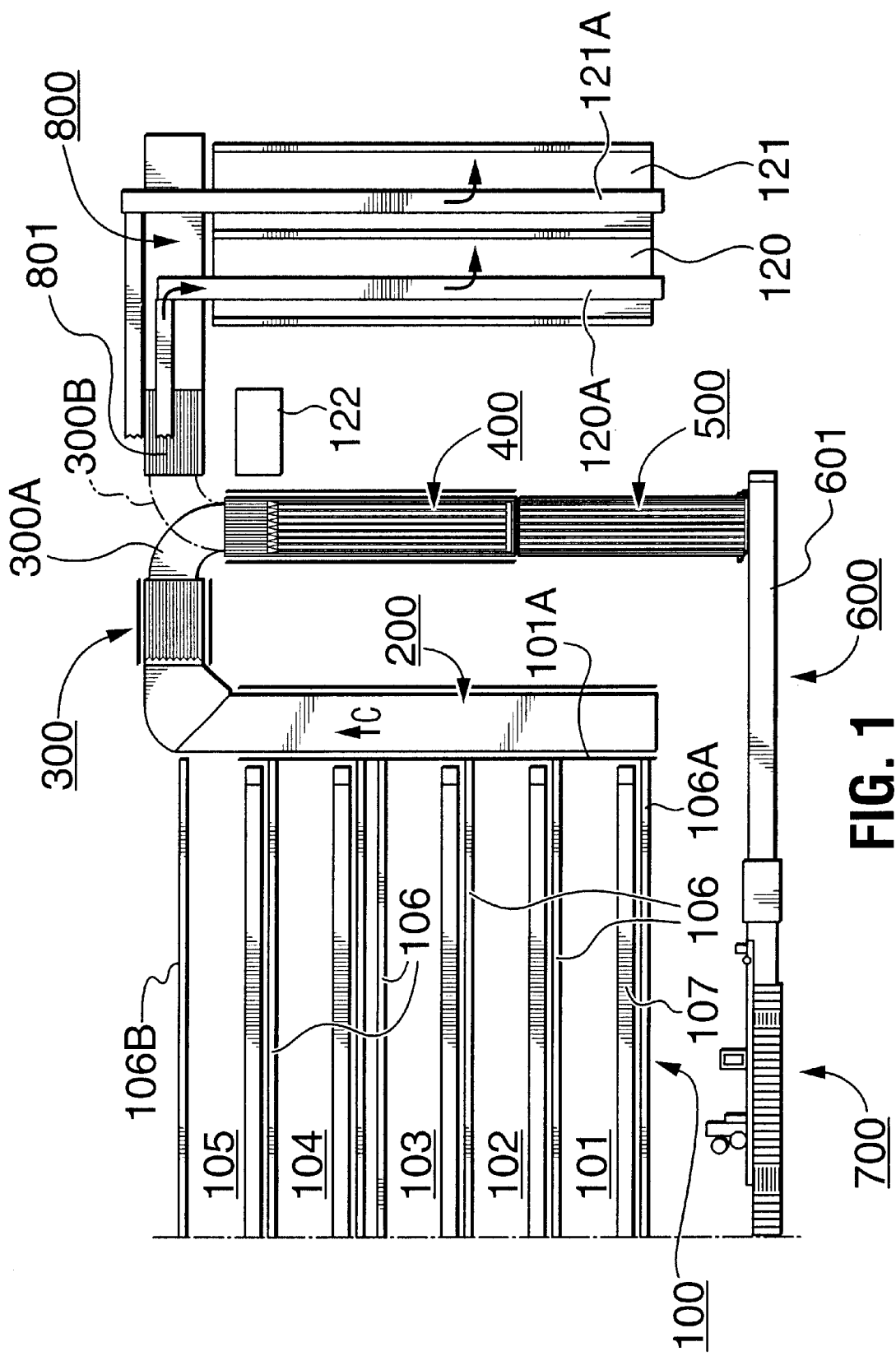
FIG. 1 is a top plan view of a portion of a waste wood recovery installation having conveyors, and a conveyor system, provided in accordance with the present invention.
Figure 2:
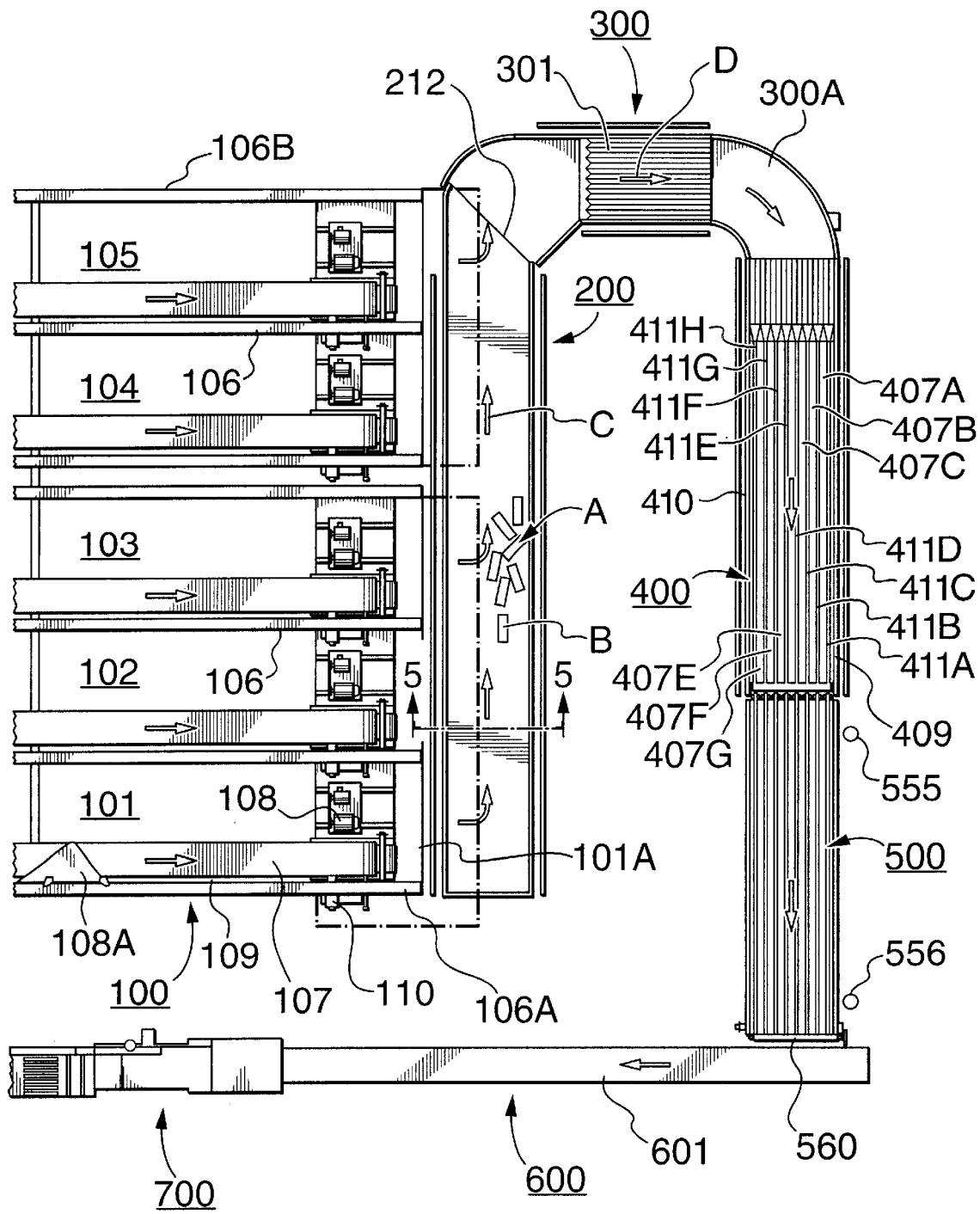
FIG. 2 is similar to FIG. 1, but on a larger scale, illustrating the principal components of the conveyor system provided in accordance with the present invention.
Figure 3:
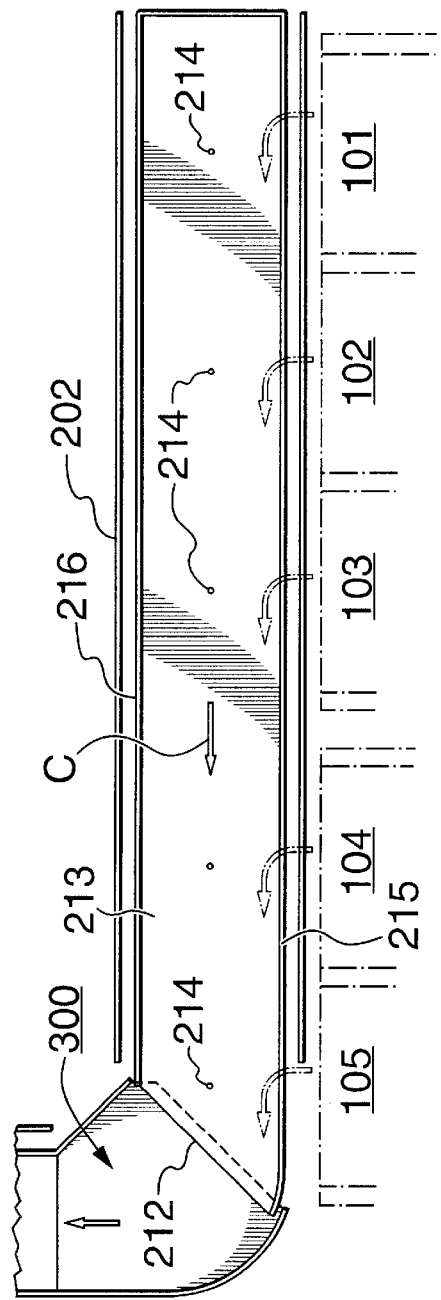
FIG. 3 is a partial top plan view of the in-feed conveyor.
Figure 4:
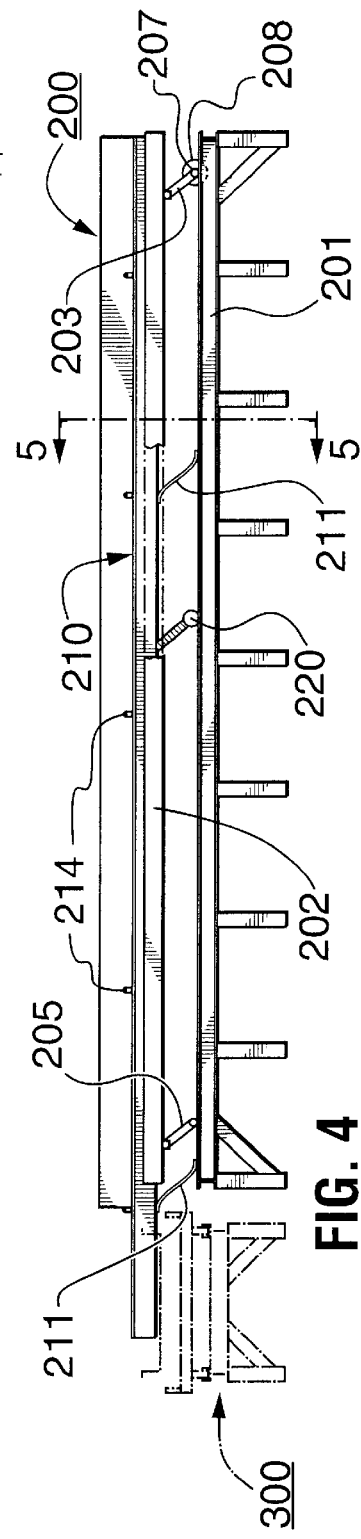
FIG. 4 is an elevational view of the conveyor shown in FIG. 3.
Figure 5:
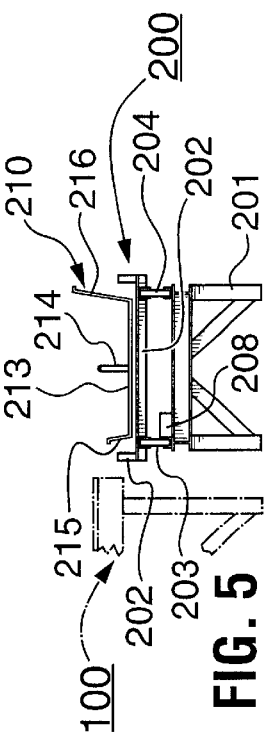
FIG. 5 is a sectional along line 5—5 of FIGS. 2 and 4.

Illustrated in FIGS. 1 and 2, in top plan view, is a material handling system comprising a storage bin area 100 with an in-feed conveyor for each respective one of a plurality of bins, a first in-feed vibrating type conveyor 200, a 90 degree vibrating type second conveyor 300, an alignment and vibrating type third conveyor unit 400, a multi-lane article single file belt type conveyor 500 and an in-feed conveyor 600 that conveys wood blocks to a wood processing system 700 herein being a finger jointing wood processing system. The unit 500 is a multi-path single file accumulator with a gated outlet to controllably release, one lane at a time, the wood pieces onto the conveyor 600.

In the particular horizontal conveyor arrangement illustrated, ie generally "U" shaped in plan view, there is a conveyor unit 300A between the out-feed of the conveyor 300 and the in-feed of the conveyor unit 400. The conveyor unit 300A is a curved belt nose roller conveyor with a 60" belt width and by way of example, and considered suitable, is one known in the trade by the Trade Mark "HYTROL" model PBCN available from Hytrol Conveyor Co. Inc. located in Jonesboro Arkansas USA. This conveyor causes the flow path of the wood pieces to change direction by up to 90 degrees while at the same time maintaining any initial alignment that may have been given to the articles as they move forwardly by the conveyor. Other conveyor layouts can readily be arranged in anything from a straight line to an "L" shape to the "U" shape shown or anything there between. Also various arrangements, combinations and/or sub-combinations of the different conveyor units can be used in the conveyor system.

The storage bin area 100 is a primary supply area of wood blocks to be processed and includes five separate bins designated respectively 101, 102, 103, 104 and 105. Bin 101, for example, may contain a supply of 2"×3" wood pieces while bins 102 and 103 may contain respectively 2"×4" and 2"×6" pieces of wood. Bins 104 and 105 may contain better quality pieces of for example respectively 2"×3" and 2"×4". The bins are separated one from another by a plurality of longitudinally extending vertical walls 106 and bins 101 and 105 have respective outer side walls 106A and 106B.

All of the bins are of the same construction and thus only one will be described in somewhat further detail, the floor in each being a conveyor. Referring to FIG. 2 wood pieces are delivered to bin 101 by a conveyor 107 driven by a motor 108. Wood pieces are diverted off the conveyor 107 into the bin by a shear head piece 108A that is moveable longitudinally of the bin on a rail 109 by a drive unit 110. There is an in-feed conveyor and shear head diverter for each of the respective bins.

A further pair of bins 120 and 121 hold a supply of higher value wood pieces and a still further supply can be provided at a pallet receiving station 122. Wood pieces from bins 120 and 121(see FIG. 1) are discharged onto another vibrating conveyor 800 which has a wood piece alignment section 801. There are wood piece distribution conveyors 120A and 121A associated with respective bins 120 and 121 and the flow path of wood pieces is indicated by the arrows. The conveyor unit 300A is preferably mounted on casters and thus readily moved to receive the pieces from conveyor 800 and move them to the in-feed end of the conveyor unit 400.This positioning of unit 300A is shown partially by broken line designated 300B in the drawings.

Each bin 101 to 105 and bins 120 and 121 have a floor bottom constructed of parallel reciprocally movable slats that are controllably movable to act as a conveyor and move the wood pieces thereon from the respective bins onto the in-feed conveyor 200(or in-feed conveyor 800 as the case maybe). Bin 101, by of example, is open at the end designated 101A. Reciprocating floor conveyors are known and thus will not be further described herein and, for further information, reference maybe had to U.S. Pat. No. 5,839,568 issued Nov. 24, 1990 to G. B. Clark. While reciprocating slat floors are preferred, if desired, these can be replaced with a belt on the floor and means to move the belt and thus convey the wood blocks for discharge onto the in-feed conveyor 200.

The present conveyor system has been designed specifically to feed the wood blocks, that have been pre-sorted and graded to selected quality level, to a jointer processing system which produces finger jointed useful pieces of lumber. The system and/or components to be described hereinafter obviously will have other uses as will become apparent to those skilled in the art. The unit 400, to be described in detail herein after, and provided in accordance with a principal aspect of the present invention, replaces a task that is currently done manually and thus not only provides for a more uniform rate of production but also an increased rate of production.

Conveyor 200

Referring to FIGS. 1 and 2 there is illustrated a random bunch A of individual wood blocks B from a source of supply in the storage bin area 100 that have been deposited on the conveyor 200 and they are moved by the conveyor 200 in the direction of arrow C. The blocks for example maybe various lengths of one of 2"×3", 2"×4" or 2"×6" and such lengths maybe in the range of 10" to 36". By way of example blocks B are pieces of 2"×6" which will be processed into useful lengths of 2"×6".

The first in-feed conveyor 200 is a typical commercially available vibrating type conveyor for example a leaf or coil spring conveyor that is preferably dynamically balanced. If the conveyor is not dynamically balanced then a more robust foundation is required. Vibrating conveyors are available from different sources, one being the Action Equipment Company Inc., located in Newberg Oreg. Basically the conveyor 200 comprises a base 201 having a balance beam 202 mounted thereon by a pair of arms 203,204 at one end and a second pair of arms 205,206 at the other end. An eccentric 207 connects one end of arm 203 to the base 201 and the eccentric is driven by an electric motor 208. Similarly arm 204 is connected to the base by a motor driven eccentric. The arrangement is illustrative only as the construction and operation is well known in the art.

An elongate trough 210 is connected to the base 201 by a plurality of leaf springs 211. The trough 210 is located above and spaced from the balance beam 202 and it extends there beyond terminating in an out-feed end 212. The trough has a bottom wall 213 with a plurality of spaced apart posts 214 projecting upwardly therefrom. The posts are illustrated as being located at a position midway between respective opposite side walls 215 and 216 but they could be variously positioned and be of various heights. The purpose of these posts is to assist in separating piles of blocks. The wall 216 is shown as being of greater vertical height than the wall 215 but this need not be so.

The trough 210 is vibrated by a power driven eccentric unit 220 the eccentric being 180 degrees out of phase with the vibration inducing means 207 of the balance beam 202. While balance beams are not essential to the operation of a vibrating type conveyors they do reduce noise and minimize forces on the support structure.

Conveyor 200 has been designed, in the present system, to move the wood blocks forwardly at a rate of 40 feet per minute. This speed is only by way of example and arbitrarily chosen. It will be noted hereinafter that each succeeding conveyor runs slightly faster than the previous one and this is for the purpose of pulling the blocks from one another to facilitate singulation.

Conveyor Unit 300

Figure 6:
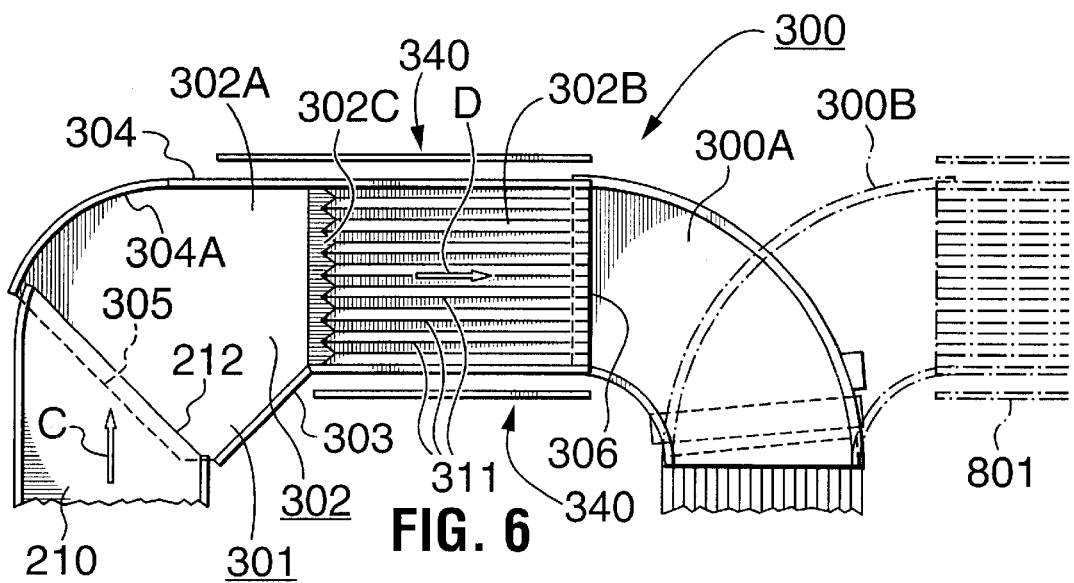
FIG. 6 is a top plan view of a 90 degree direction change second conveyor which incorporates a first alignment section.
Figure 7:
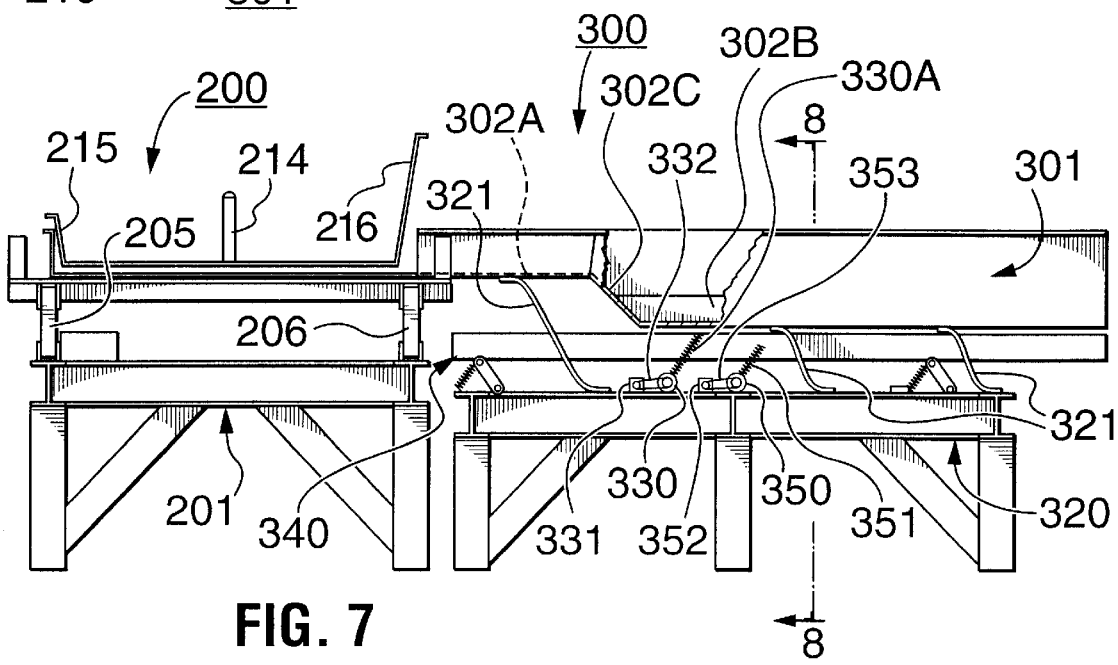
FIG. 7 is an elevational view of the conveyor shown in FIG. 6.
Figure 8:
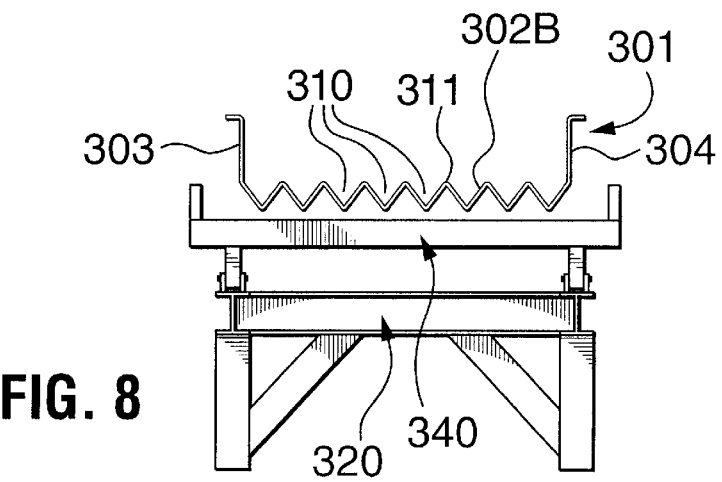
FIG. 8 is a sectional view along line 8—8 of FIG. 7.
Figure 9:
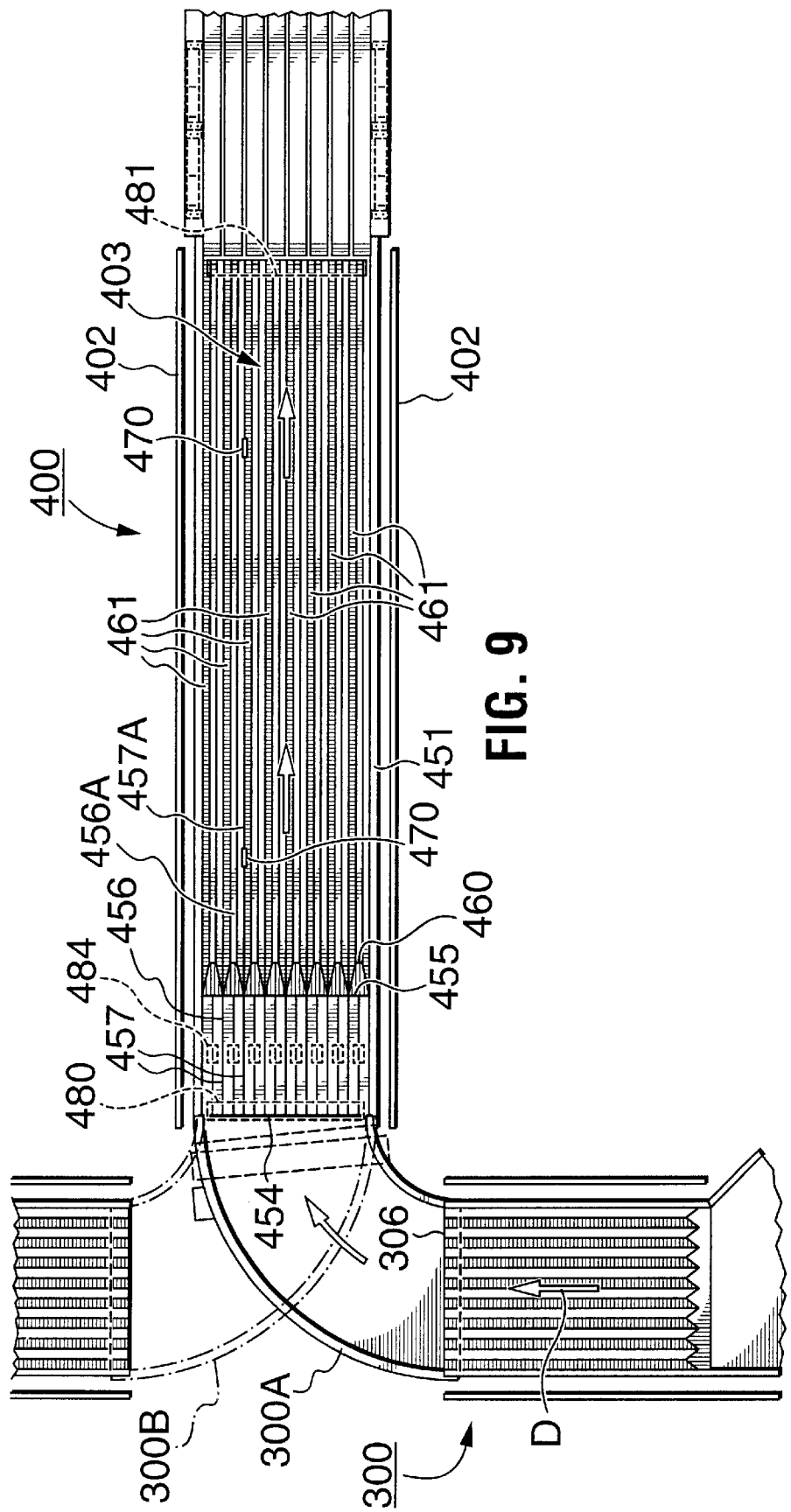
FIG. 9 is a top plan view of an alignment and vibrating conveyor unit provided in accordance with a principal aspect of the present invention.

Referring now to the second conveyor 300 attention is directed particularly to FIGS. 6 to 8 inclusive. The conveyor 300 is a vibrating type horizontal conveyor having a trough 301 defined by a bottom wall 302 and respective spaced apart side walls 303 and 304. The trough 301 has an in-feed end 305 located below and upstream of the outlet end 212 of the conveyor 200 and an out-feed end 306.

The side wall 304 has a portion 304A curved (in plan view) that causes the wood pieces moving thereon to change their direction of travel so as to have a travel path, designated D, angularly disposed with respect to path C on conveyor 200. In the present conveyor layout the change is 90 degrees but it could be anything from 0 degrees ie a straight line path to something greater than 90 degrees.

The trough bottom wall 302 has an initial infeed portion 302A which has a substantially planar portion that is followed (after the flow path change in direction ) by a portion 302B that has an undulating upper surface providing a plurality of parallel flow paths that define the direction of travel of the path designated D. This is an initial or first alignment section in the conveyor system.

The undulating surface (as seen in cross-section in FIG. 8) is saw-tooth in form providing a plurality of parallel channels 310 separated one from the next by a crest 311. There are 8 channels 310 in the present embodiment (there could be more or less) and these channels provide a first alignment section in which the longitudinal axis of the wood pieces start aligning parallel to the direction of flow. At the transition from the trough planar surface 302A to the multiple parallel path section 302B there is an inclined short portion 302C. This allows the crests 311 to be at a lower elevation than the planar surface portion 302A and this is believed to facilitate the initial alignment process. The number of channels in this embodiment is by way of example only and it will obvious there can be more than 8 or less than 8 if so desired for the installation and/or use at hand.

The conveyor 300 has a base frame 320 with the trough 301 supported thereon by a plurality of leaf springs 321 and it is vibrated by a power driven eccentric 330 via spring means 330A. The drive for example may be an electric motor 321 and 'V' belt 332. Vibration systems for conveyors are known in the trade.

The vibrating conveyor 300 has an open framework balance beam 340 located between the base 320 and the trough 301. A power driven eccentric 350 is connected via a spring means 351 to the balance beam 340. The eccentrics 330 and 350 are 180 degrees out of phase and the eccentric 350 is driven for example by an electric motor 352 via a 'V'-belt 353. Conveyor 300 is designed to move the wood blocks forwardly at a rate of 45 feet per minute, ie faster than the previous conveyor.

In FIG. 7 the framework 201 of conveyor 200 is shown below the inlet portion of the conveyor 300. However in this figure a portion of the framework 320, that carries the inlet portion of the conveyor, 300 has been omitted for purposes of clarity.

At the out feed end of the conveyor 300 is the conveyor 300A which, as previously mentioned, changes the path of travel by 90 degrees while at the same time without affecting or disturbing the alignment of the blocks whereby the blocks in their new path of travel have the same alignment relative to one another that they had before the 90 degree turn. Other conveyor system layouts, combination of conveyor units and/or sub-combination of conveyor units maybe used. If the system is a straight line then the change direction conveyor unit would not be required.

Conveyor Unit 400

The conveyor unit 400 is the combination of a vibrating conveyor and a belt conveyor with the articles moved by one or the other depending upon the location of the articles on the trough.

In the conveyor system of FIGS. 1 and 2 unit 400 serves as a wood block separation and second alignment section and has been so designed that the vibration moves the wood pieces forwardly at a rate of 50 feet per minute, ie faster than that of the previous conveyor. The belt conveyor serves as a block separation with the pieces riding thereon moving at a rate of 450 feet per minute while conveying them in single file. As previously mentioned the conveyor rate of travel is by way of example only and obviously can vary from one installation to another and/or one use to another. Each succeeding conveyor has been designed to move the wood pieces at a higher rate of speed than the immediately proceeding conveyor. The channels in which the belts are located provide alignment and guide means for the blocks.

Referring now principally to FIGS. 9 to 15 inclusive the conveyor unit 400 has a rigid open framework base 401 on which there is mounted a balance beam 402 and an elongate trough 403. As is also the case in the previously described vibrating conveyors, the mass of the balance beam equals the mass of the trough and the vibration inducing means of the beam and trough are 180 degrees out of phase, with respect to one another, for reasons well known in the art.

The balance beam 402 is mounted on the support frame 401 by a plurality of arms 405 and spring means 406. Each arm 405 is pivotally connected at one end by a pin 407 to the base 401 and at the other end by pin 408 to the balance beam. The springs 406 maybe leaf or coil springs.

A first vibration inducing mechanism comprising a power driven eccentric 420 is connected to the balance beam 402 through a coil spring 421. The eccentric is mounted on the base 401 and driven by an electric motor 422 via a 'V' belt 423. A second vibration inducing mechanism in the form of a power driven eccentric 440 is mounted on the frame 401 and connected to the trough 403 via spring 440A. The eccentric 440 is driven by an electric motor 441 via a 'V' belt 442. The trough is vibrated at a rate so as to move the wood blocks thereon at a rate of 50 feet per minute.

The trough floor is unconventional in that it has an undulating upper surface in which the valleys provide a plurality of parallel flow channels and this is a second wood piece alignment section for the conveyor system. The wood pieces on this portion of the conveyor are moved as a result of vibration forces induced on the trough. Some of the pieces however might ride on the crests of the undulating surface but as they continue to move forwardly many (if not all) go into the valleys of the undulating surface and thus become aligned in single file in the respective valleys and those that don't ride the crests. The valleys of this second alignment section are aligned with deeper longitudinally extending channels that are separated one from the next by walls that, in the upper portion, slope upwardly away from the respective channel associated therewith, terminating in an apex extending longitudinally of the trough. Spaced apart tapered ribs project upwardly from these apexes to direct wood blocks, that maybe riding on the apexes, into the channels.

The top flight of a narrow endless belt conveyor rests on the bottom floor of the respective channels and these belts travel at a rate of about 450 feet per minute thus spacing the wood pieces apart from one another.

Figure 10:
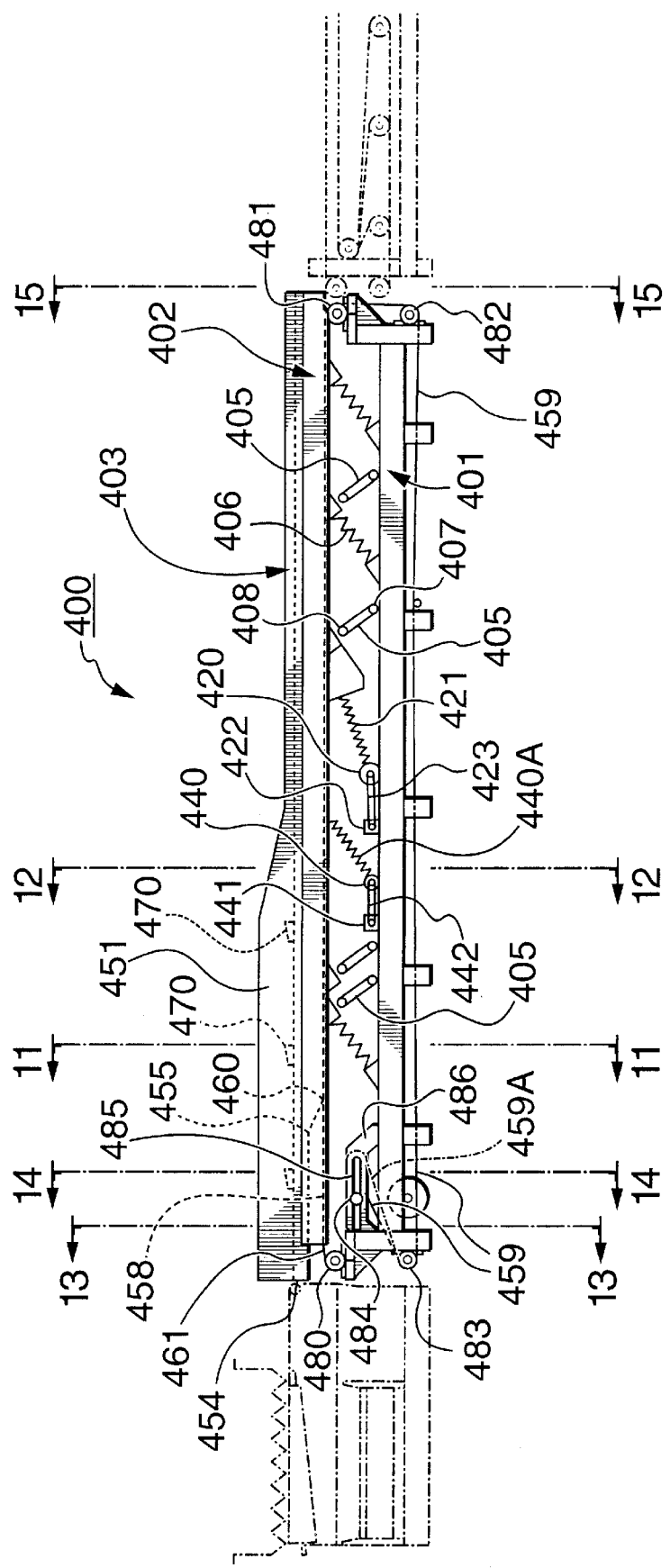
FIG. 10 is an elevational view of the conveyor unit shown in FIG. 9.
Figure 13:
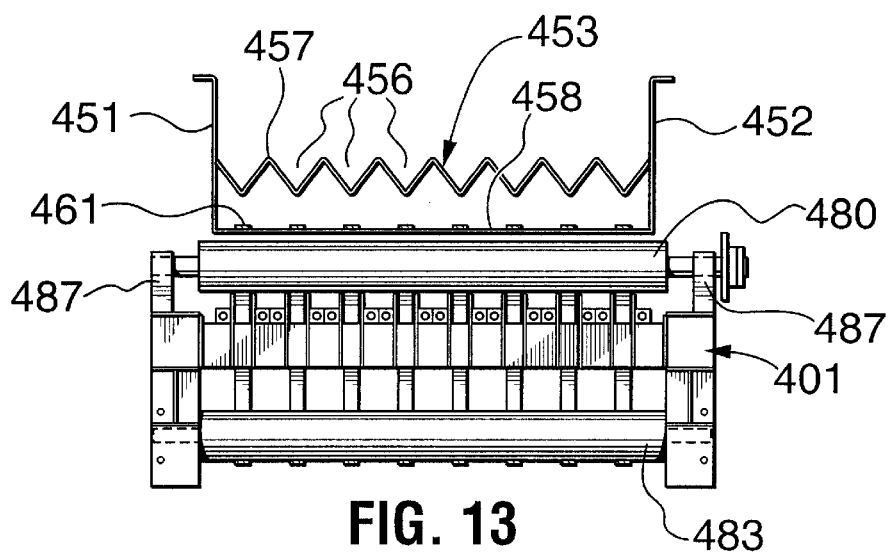
FIG. 13 is a partial sectional view along line 13—13 of FIG. 10.
Figure 14:
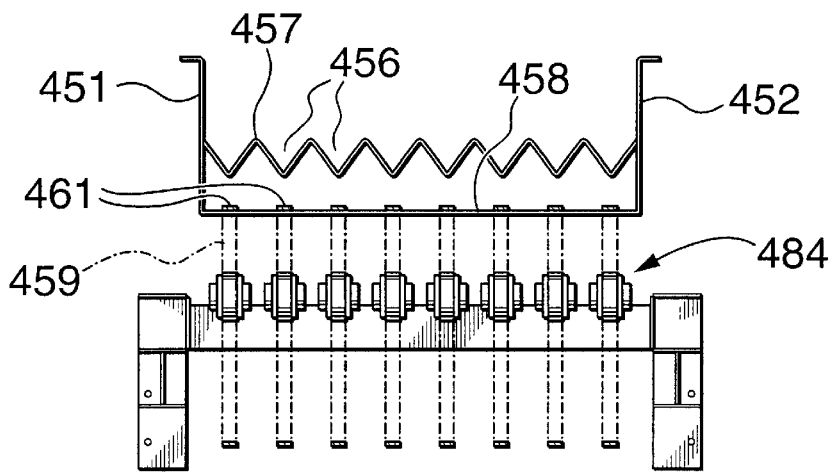
FIG. 14 is a partial sectional view along line 14—14 of FIG. 10.
Figure 15:
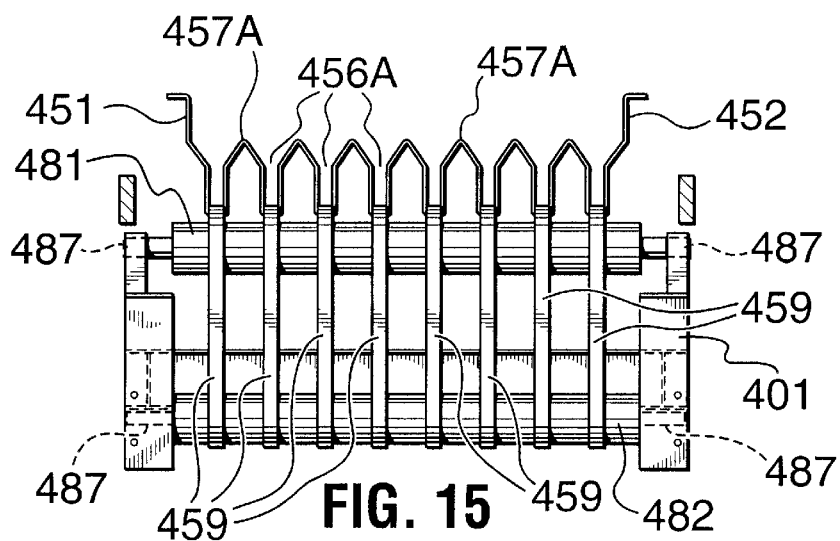
FIG. 15 is an end elevational view along line 15—15 of FIG. 10.

The profile of the upper surface of the trough is shown in FIGS. 11 to 15 inclusive which are cross-sections at locations as indicated in FIG. 10. Referring to these figures the trough has respective spaced apart side walls 451 and 452 and a bottom wall 453. The in-feed end portion of the trough has a bottom wall upper surface profile as seen in FIGS. 13 and 14 extending from the in-feed end 454 to a location designated 455 in FIG. 10. As seen in FIGS. 13 and 14 the upper surface is saw-tooth in profile providing a plurality of side-by-side channels 456 separated one from the next by a crest (apex) 457. There are 8 parallel channels in the five foot wide trough and, in the present embodiment (typically) the crest-to-crest distance is 7.5". These dimensions are by way of example only as they can be modified to suit the circumstances at hand. A channel is effectively a depression in the bottom of the trough and there could be, if desired, only one such depression or more with each having a belt therein.

The channel side walls are illustrated as having planar surfaces. The walls however could be curved providing rounded surfaces in a direction from the channel to the apex on the portion separating one channel from the next.

Figure 11:
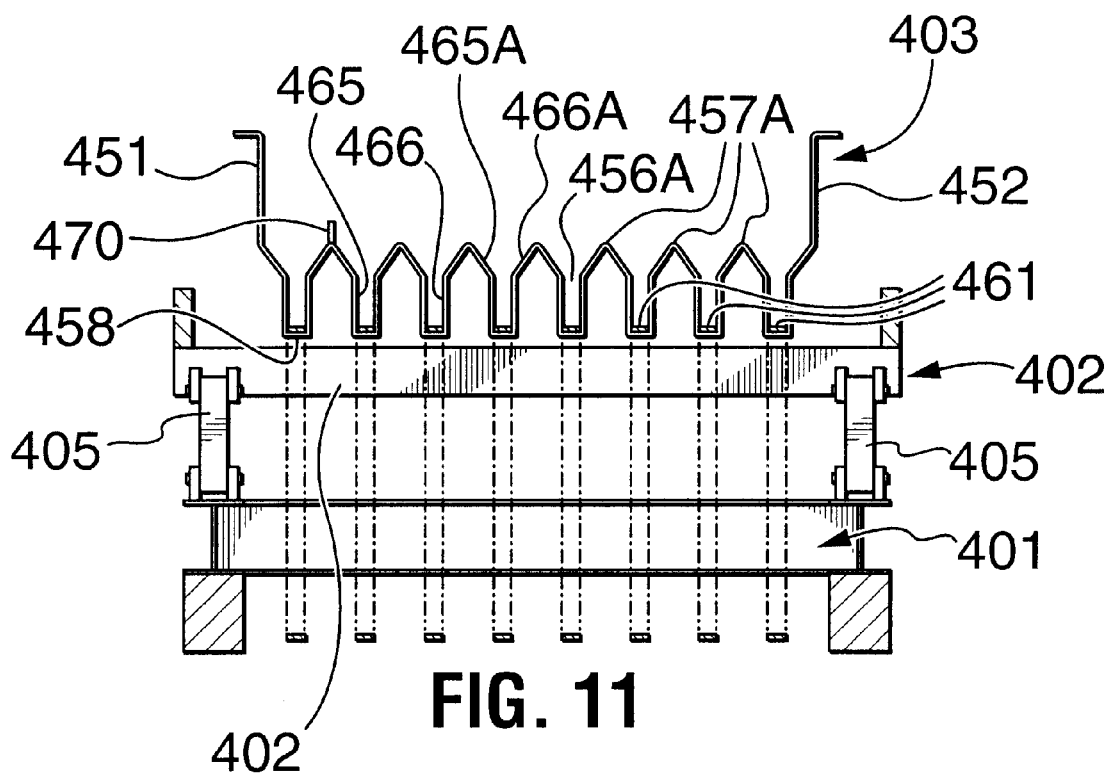
FIG. 11 is a partial sectional view along line 11—11 of FIG. 10.
Figure 12:
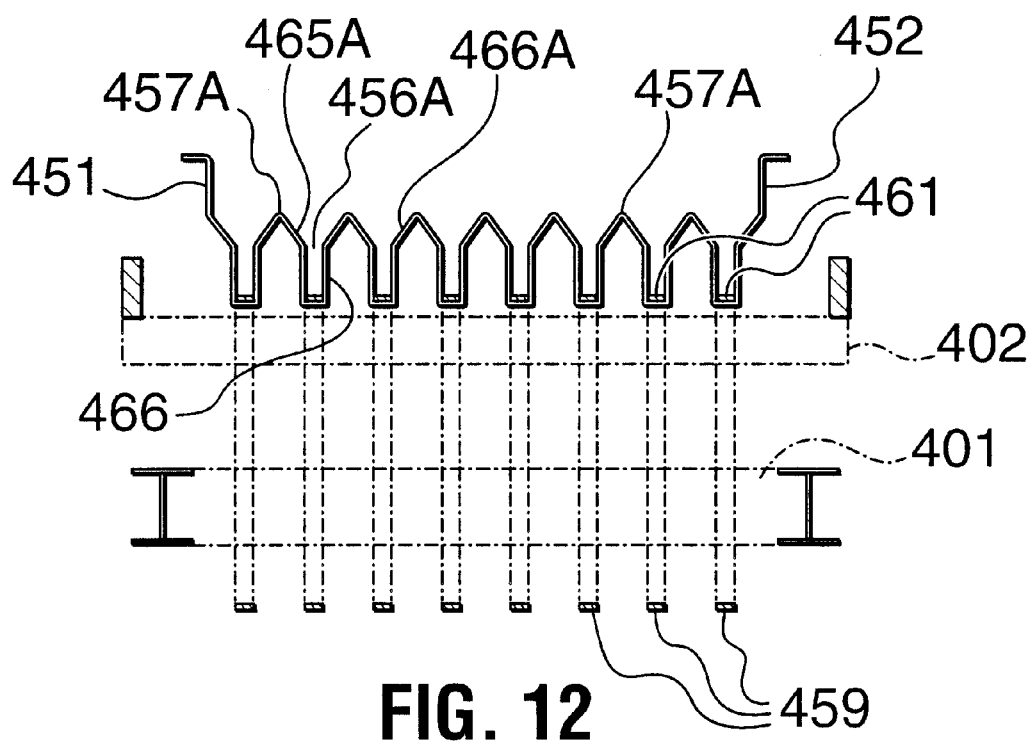
FIG. 12 is a partial sectional view along line 12—12 of FIG. 10.

Below the bottom wall 453 is a floor 458 that extends the full length of the trough 403. The upper flight 461 of eight endless belts, to be described further hereinafter, slidably engage the upper surface of the floor 458. At the location designated 455 in FIG. 10, each channel bottom slopes downwardly in the direction of flow to the floor 458 joining the same at the location designated 460 in FIG. 10. The profile of the trough from the location designated 460 to the out-feed end is shown in FIG. 11 in which the channels designated 456A are continuations of respective ones of the channels 456. The channels 456A have a lower major portion defined by spaced apart vertical side walls 465 and 466 and an upper minor portion defined by sloping walls 465A and 466A. The walls 465A,466A slope away from one another in a direction upwardly from the channel associated therewith and the sloping walls of adjacent channels 456A meet at an apex 457A. As mentioned hereinbefore these walls, while shown as being planar surfaces, could be curved ie rounded. A belt flight 461 runs on the bottom surface of each of these channels and obviously a friction reducing replaceable strip can be interposed between the belt and the floor.

The walls 465 and 466 are spaced apart from one another by a distance slightly greater than the thickness of the wood blocks to be processed so that the wood blocks can slide freely in the channel. For 2" thick wood blocks (that actually measure 1.5") the wall spacing is about 2" to 2.5". Actually the spacing will be less than any dimension of the block other than its thickness, ie one physical characteristic common to all blocks. These walls may be spaced wider apart and then spacer pieces inserted, for example insert strips maybe secured to one or the other or both of the walls 465 and 466 to give the desired spacing. These inserts could be replaceable wear strips made of friction reducing material In some instances wood pieces will span across a number of the apexes 457 (or 457A as the case may be) and move forwardly askew to the direction of travel. To ensure these pieces align with and drop into one of the channels 456 (or it's continuation 456A)there are, as previously mentioned, spaced apart tapered ribs 470 mounted on and projecting upwardly from the crests 457,457A(see FIGS. 9&10). Ribs 470 can also be mounted on the crests of any of the units having channels defining flow paths ie conveyors 300 and/or 800

The second conveying means of unit 400 is a plurality of endless belts 459, one for each channel 456A, with the previously mentioned upper span 461 located in the bottom of the respective channel associated therewith. Each belt loops around a pulley 480 adjacent the in-feed end of the conveyor unit 400, a power driven pulley 481 at the out-feed end, a pair of turn pulleys 482,483 mounted at a lower elevation adjacent respective opposite ends of the support frame 401 and an adjustable idler belt tension roller 484 with adjustment being provided for by a slot 485 in an arm 486 secured to the frame 401. A belt is shown in broken line 459A in FIG. 10 at the maximum slack take-up position of the adjustable roller. The rollers (or pulleys as they may also be referred to as)are mounted by suitable pillow block bearings 487 on the frame 401. The wood pieces, by virtue of the first alignment section provided by channels 310 of conveyor 300 and the second alignment section provided by the channels 456 along with an in-feed portion of the guide channels 456A, as they move forwardly become aligned one after another in single file in each of the 8 parallel paths provided by such channels. The top flight 461 of the conveyor belts 459 travel at the rate of 450 feet per minute and this separates one block from another. In this unit 400 the wood blocks on the trough are caused to move by the vibration induced in the trough while the blocks in the channels(ie in the depressions in the bottom of the trough) are carried forward by the moving belts.

Guide and Cueing Section 500

Downstream of the conveyor wood block separating and guide unit 400 is the block accumulating, cueing and guide unit 500. Referring principally to FIGS. 16 to 19 inclusive the unit 500 comprises an elongate trough 501 supported by frame members 502,503 and 504. The trough has a profile as shown in FIG. 19 and comprises spaced apart parallel side walls 505,506 and a bottom wall 507. A plurality of parallel spaced apart dividers 508, together with the side walls, define 8 parallel channels 510 in which the wood pieces cue up before being controllably released, one lane at a time, by a suitably actuated gate 512 onto the conveyor 600. There is a separate, controllably openable and closeable, gate for each of the respective 8 channels.

Each divider 508 has a major lower portion comprising a pair of vertical walls 513 and 514 and an upper minor portion comprising sloping walls 515 and 516 that merge together terminating at the top in an apex 517. The vertical walls in the present embodiment are about 5.5" high ie the width of a 2"×6".

There is an endless belt conveyor for each of the 8 channels with the top flight of the belt sliding on the bottom wall of the channel. As previously mentioned friction reducing replaceable strips can be inserted between the belt and the channel bottom wall if so desired.

The belt conveyor comprises a roller 520 journalled on the frame 504 and driven by a motor 521 via belt 522, a variable speed drive 523 and a chain 524. At the opposite end (in-feed end) of the trough there are 8 belt pulleys 526 journalled on the support frame 502. The return run of the belts is supported by rollers designated respectively 527, 528 and 529 journalled by suitable means on the frame.

There are 8 endless belts 530, one for each of the 8 channels, looped around rollers 520 and 526 and the tension is controlled by a series of idler pulleys 535 and 536. The upper flight of the belts 530 slide on the trough bottom wall 507 (or a suitable friction reducing wear strip thereon).

Each gate 512 is slidably mounted in a guide 538 and moved by an air or hydraulic cylinder 540 to a raised position blocking the outflow of wood blocks from the channel and a lower position (gate open) allowing for the free outflow of wood pieces from the channel associated therewith.

Figure 18:
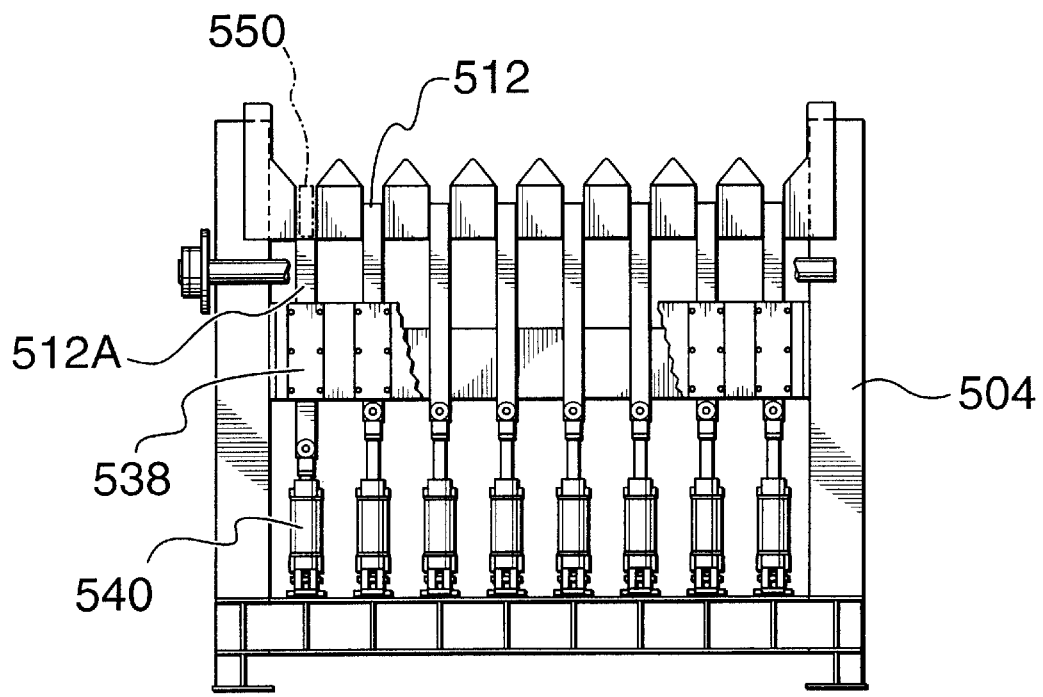
FIG. 18 is an end elevational view of the conveyor in FIG. 17 taken along line 18—18 of FIG. 17 but with parts omitted for clarity.
Figure 19:
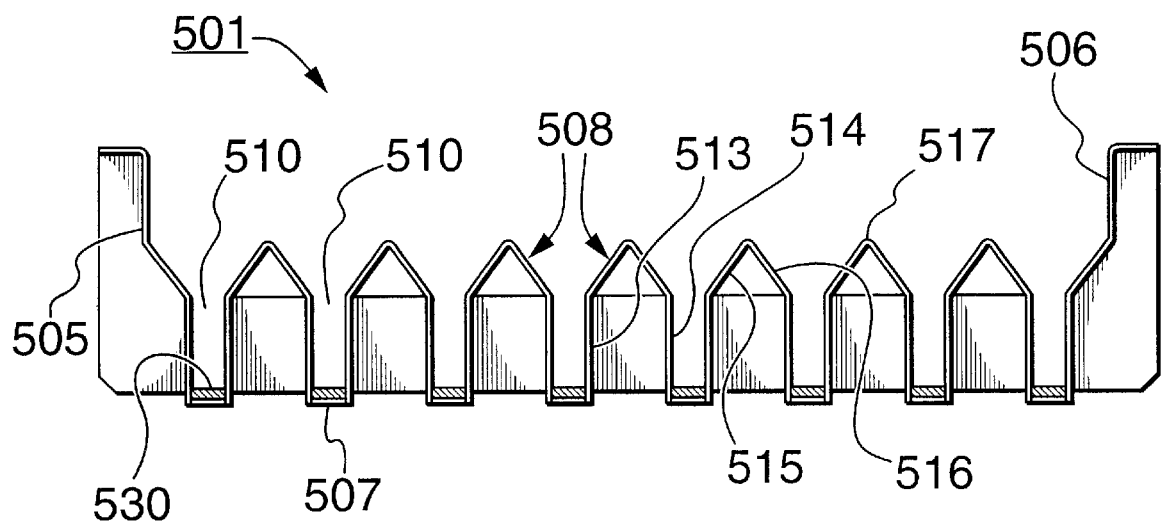
FIG. 19 is a partial sectional view along line 19—19 of FIG. 17.

In FIG. 18 all of the gates except one are shown in their raised (closed) position. The one open gate is designated 512A and in the channel associated therewith, shown in broken line, is an end view of a piece of 2"×6" designated 550. Control of the gates is in response to signals from photo cells 555, 556 detecting respectively a channel full condition and a channel empty condition to respectively open and close a gate. Various sensing means may be used and in the present embodiment photo cells 555 and 556 are gangs of cells extending across the top of the channels and provide signals for each channel independently of the other channels.

Mounted on the frame 504 is a hurry-up roll or off-feed power driven roller 560 driven by an electric motor 561 via a belt 562. The top of the off-feed roller 560 is about 6" higher than the belt of conveyor 600. The wood pieces are controllably released from the channels and the speed of the belt conveyor 600 is such that the pieces are spaced from one another on the belt with each piece being transverse to the direction of travel of the belt.

In the foregoing the reference to endless belt is used in its broadest sense and includes any form belt or other suitable strip of suitable material in the form of a closed loop.

The individual conveyor belts for the respective channels in some instances could be replaced by a single belt spanning in width across all of the channels in which case the bottom of the channels would be open allowing the wood blocks to ride on the upper span of the belt. This however requires a more complicated and/or less rigid structure.

In the foregoing conveyors 400 and 500 have the same top profile and the reason for this is that in the event some wood pieces ride on the apexes of conveyor 400, without dropping into the channels, or conversely align but ride on top of another piece that is in the channel, they will enter conveyor 500 without interrupting the overall piece flow and eventually get delivered to conveyor 600 without jamming or otherwise stopping the flow.

We claim:

1. A conveyor unit to separate and guide articles as they are moved forwardly by said conveyor unit comprising a support frame, a longitudinally extending trough resiliently mounted on said frame, vibration inducing means connected to said trough and operable to vibrate said trough and thereby cause articles thereon to move forwardly, at least one longitudinally extending recessed area in a lower portion of said trough, each said recessed area extending in a direction lengthwise of the trough and an endless movable belt conveyor having an upper flight portion of the belt located in said recessed area and extending longitudinally there along.

2. A conveyor unit as defined in claim 1 including means drivingly connected to said belt and operative to drive the same at a rate of speed greater than the speed at which the articles are moved forwardly by the vibration induced in the trough.

3. A conveyor unit as defined in claim 1 wherein each said recessed area comprises an upwardly facing channel defined by a pair of spaced apart downwardly extending side walls and a bottom wall, each said channel being substantially narrower in width than the width of said trough.

4. A conveyor unit as defined claim 3 wherein each said side wall has a lower major portion disposed substantially vertically and an upper minor portion sloping upwardly in a direction away from the channel associated therewith.

5. A conveyor unit as defined in claim 4 including a plurality of said upwardly facing channels disposed in side-by-side spaced apart parallel relation in said trough, each said channel having the upper flight portion of the belt conveyor located at a position adjacent said bottom wall.

6. A conveyor unit as defined in claim 5 wherein said bottom wall of each channel is closed and wherein said upper flight portion of the belt is slidably supported on said bottom wall.

7. A conveyor unit as defined in claim 5 wherein the upwardly sloping walls of two adjacent channels meet in an apex, said apexes providing a plurality of parallel spaced apart ridges.

8. A conveyor unit as defined in claim 7 including a plurality of spaced apart ribs on said ridges and wherein said ribs project upwardly from the ridge associated therewith.

9. A conveyor unit as defined in claim 8 wherein said ribs are tapered upwardly in the direction of flow of articles on the conveyor.

10. A conveyor unit as defined in claim 5 including an article alignment section on said trough and located at a location upstream of the commencement of said channels, said alignment section comprising an undulating surface on said trough providing alternate crests and valleys and in which the valleys provide a plurality of defined flow paths having a direction lengthwise of the trough.

11. A conveyor unit as defined in claim 10 wherein said flow paths are in end-to-end alignment with a respective one of said plurality of channels.

12. A conveyor unit as defined in claim 10 wherein said undulating surface is saw-tooth in profile in a direction transverse to the length of the trough.

13. A conveyor unit as defined in claim 5 wherein each said channel has a width of approximately 1.75" and wherein the height of the major wall portion is approximately 5.75".

14. A conveyor unit comprising a frame, a longitudinally extending trough resiliently mounted on said frame, vibration inducing means connected to said trough and operable to vibrate said trough and thereby cause articles thereon to move forwardly, said trough having an article alignment first portion adjacent an in-feed end thereof comprising an undulating upper surface on the trough comprised of alternate crests and valleys in which the valleys provide a plurality of spaced apart parallel upwardly facing first channels extending in a direction lengthwise of the conveyor and a second portion having a plurality of parallel upwardly facing second channels aligned horizontally with and providing a continuation of respective ones of said first channels, each said second channel having a pair of spaced apart parallel side walls and a bottom wall with said bottom wall being at an elevation lower than the first channel associated therewith and an endless power driven belt conveyor having an upper flight portion of the belt extending longitudinally along said bottom wall.

15. A conveyor unit as defined in claim 14 wherein the side wall of one channel has an upper portion sloping upwardly and away therefrom in a direction toward the next channel adjacent thereto.

16. A conveyor unit as defined in claim 14 wherein said first channels are 'V' shape in profile in a direction transverse to the length of the conveyor.

17. A conveyor unit as defined in claim 16 wherein each side wall of said second channels has an upper portion sloping upwardly and away from the channel associated therewith and wherein said upper portions terminate at an elevation lower than the valleys of said undulating surface.

18. a conveyor unit as defined in claim 17 wherein said sloping upper wall portions of two adjacent channels, in cross-section, define an inverted 'V'.

19. A conveyor unit as defined in claim 18 wherein each said inverted 'V' has an apex and including a plurality of spaced apart ribs on said apexes and projecting upwardly therefrom.

20. A conveyor unit as defined in claim 19 wherein said ribs taper upwardly in the direction of flow of articles on the conveyor.

21. A horizontal conveyor system comprising a conveyor unit that includes a longitudinally extending trough having at least one depression with each depression providing an upwardly facing channel extending in a lengthwise direction of said trough, vibration inducing means connected to said trough and operative to vibrate the trough and thereby move articles in the trough in a forward direction, an endless belt conveyor having an upper span of the belt along the bottom of said channel to move articles, resting on the belt, in said forward direction, each said channel having a width greater than the smallest dimension of the articles to be conveyed and aligned and narrower than the remaining dimensions of such articles, an in-feed means upstream of said conveyor unit for feeding articles onto said conveyor unit and article guide means downstream of said conveyor unit, said article guide means having an upwardly facing channel aligned with each respective channel of said conveyor unit and means to move the articles in said article guide means channels in said forward direction.

22. A conveyor system as defined in claim 21 wherein said conveyor unit channels are each defined by a pair of spaced apart walls and wherein said walls have an upper portion sloping upwardly and away from the channel associated therewith.

23. A conveyor system as defined in claim 21 wherein said conveyor unit has a plurality of said channels disposed in spaced apart parallel relation in said trough and including an initial article alignment section upstream of said channels, said article alignment section comprising an undulating horizontal surface over which the articles travel, said undulating surface defining a plurality of spaced apart parallel valleys and wherein said valleys are in alignment with a respective one of said channels.

24. A conveyor system as defined in claim 21 wherein said means to move the articles in the channels of the guide means comprises an endless belt conveyor located at a position adjacent a bottom wall of the respective channels.

25. A conveyor system as defined in claim 24 wherein said article guide means conveyor comprises an endless belt for each respective channel.

26. A horizontal conveyor system comprising a conveyor unit having a longitudinally extending trough, means resiliently mounting said trough on a support structure, vibration inducing means connected to said trough and operative to vibrate the trough and thereby cause articles thereon to move forwardly, a plurality of spaced apart parallel upwardly facing first channels in said trough and extending in the direction lengthwise thereof, said first channels having a bottom wall, an endless belt for each channel and having an upper flight of the belt on the floor of the respective channel associated therewith, an in-feed conveyor means upstream of said conveyor unit for feeding articles onto said conveyor unit, and article guide and conveying means downstream of said conveyor unit, said guide means comprising an upwardly facing second channel aligned with respective ones of said first channels of said conveyor unit as a continuation thereof and wherein said conveying means comprises a belt conveyor.

27. A conveyor system for aligning and moving wood blocks comprising a vibration type conveyor having a first alignment section, said alignment section comprising a plurality of side-by-side crests and valleys and wherein said valleys define article flow paths, a second alignment and article conveying section comprising a plurality of longitudinal channels disposed in alignment with respective ones of said flow paths, said channels being deeper than said upstream valleys aligned therewith and a belt conveyor located adjacent a bottom portion of said channels for supporting and moving articles thereon.

28. A conveyor system as defined in claim 27 including a second article alignment section upstream of said channels.

29. A conveyor system as defined in claim 27 wherein said alignment sections each comprise a horizontally disposed undulating upper surface.

30. A conveyor system as defined in claim 27 wherein said alignment sections have an upper surface that is saw-tooth in form in a direction transverse to the direction of flow.

31. A conveyor system as defined in claim 27 including an article accumulating, cueing and dispensing unit having a plurality of second horizontally spaced apart channels, said first and second channels being in alignment with the latter and disposed downstream of the former, a belt conveyor for transporting articles in said second channels, gate means adjacent an outlet end of said second channels and means selectively to control opening and closing of said gates.

32. A wood block alignment and transport apparatus comprising a structure defining a plurality of longitudinally extending laterally spaced channels, one channel being separated from the next by a partition having an upper surface defining an inverted 'V' and a belt conveyor on said structure and located adjacent a bottom portion of said channels for moving articles in a forward direction in said channels and resting on said belt, means resiliently mounting said structure on a support and vibration inducing means connected to said structure to vibrate the same and thereby convey articles on said structure.

* * * * *